Jan. 10, 1933.    F. R. PRANGE ET AL    1,894,003
ANTISKID ATTACHMENT FOR WHEELS
Filed July 13, 1931    2 Sheets-Sheet 1
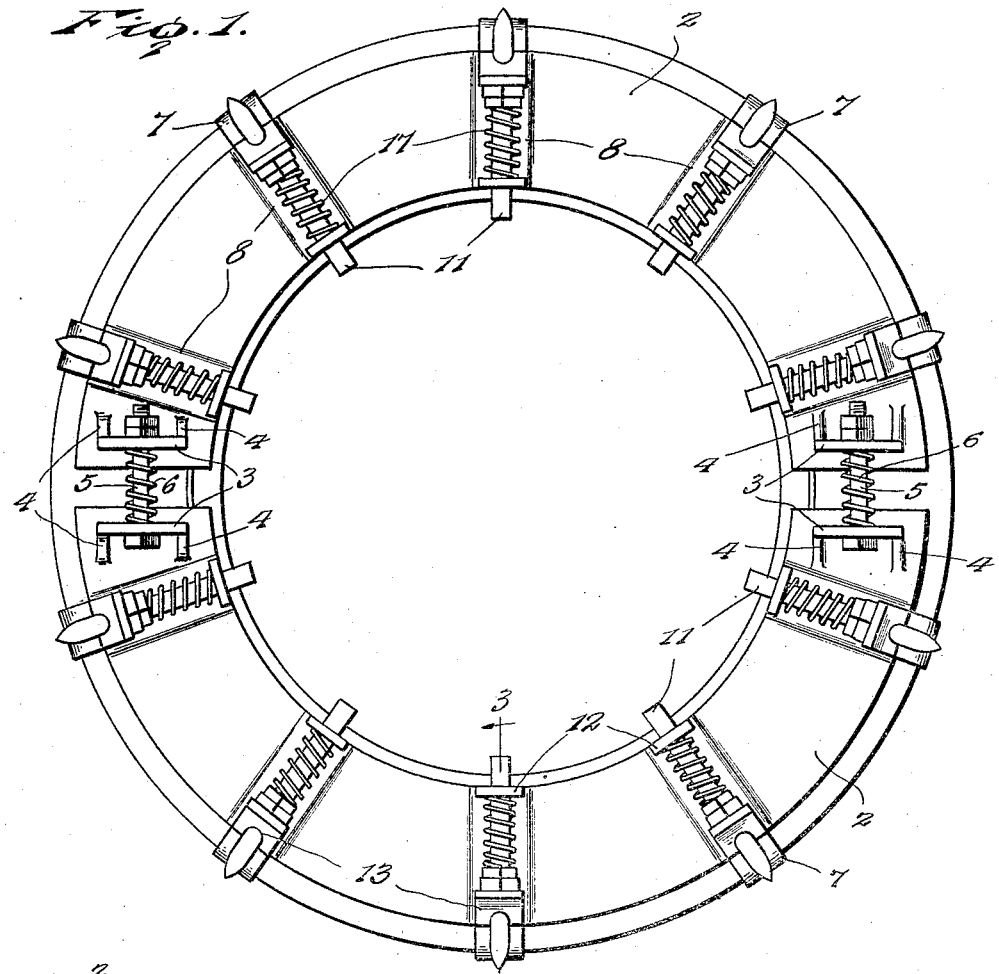
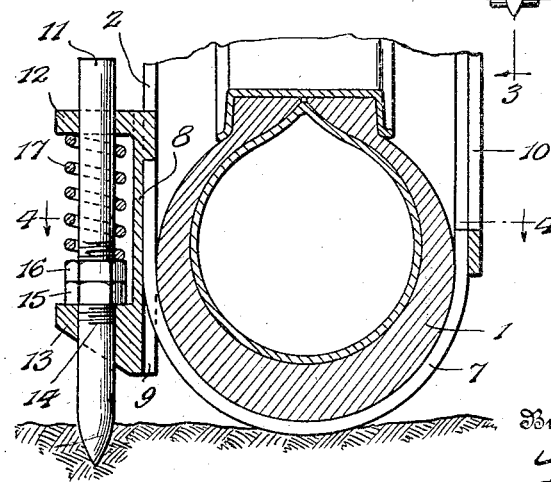
Inventors
F. R. Prange.
C. A. Prange.
By Lacey & Lacey,
Attorneys Jan. 10, 1933. F. R. PRANGE ET AL 1,894,003
ANTISKID ATTACHMENT FOR WHEELS
Filed July 13, 1931  2 Sheets-Sheet 2
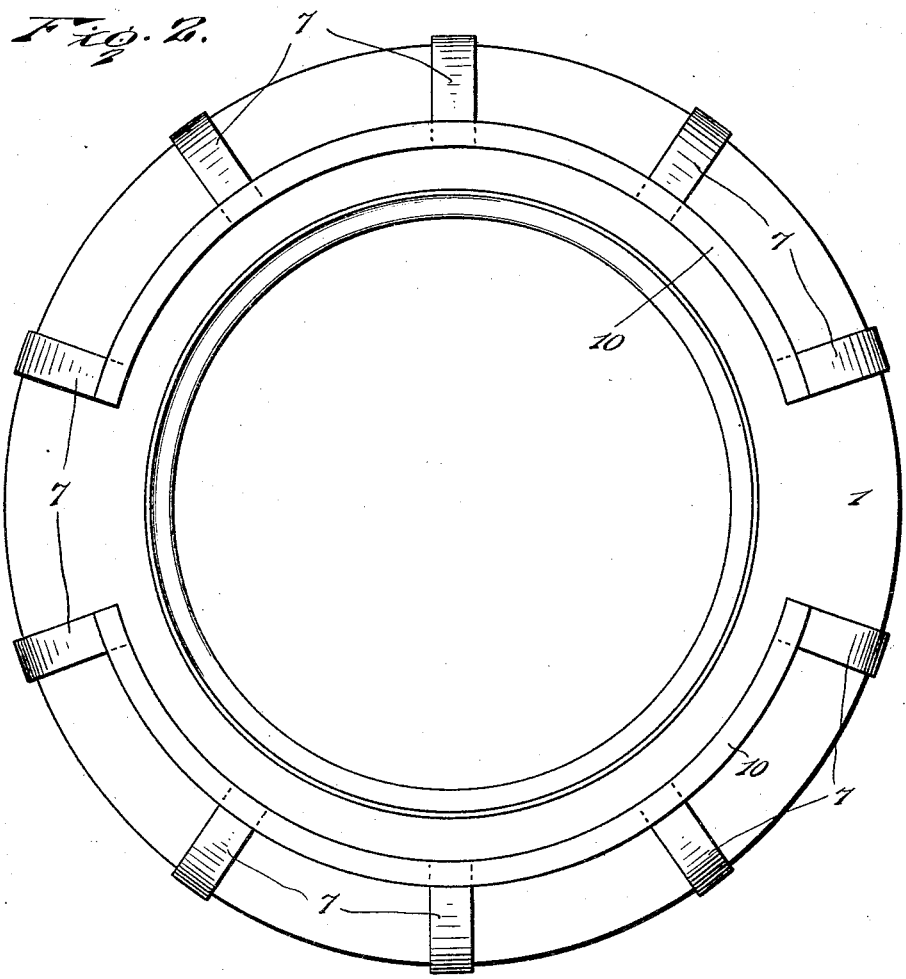
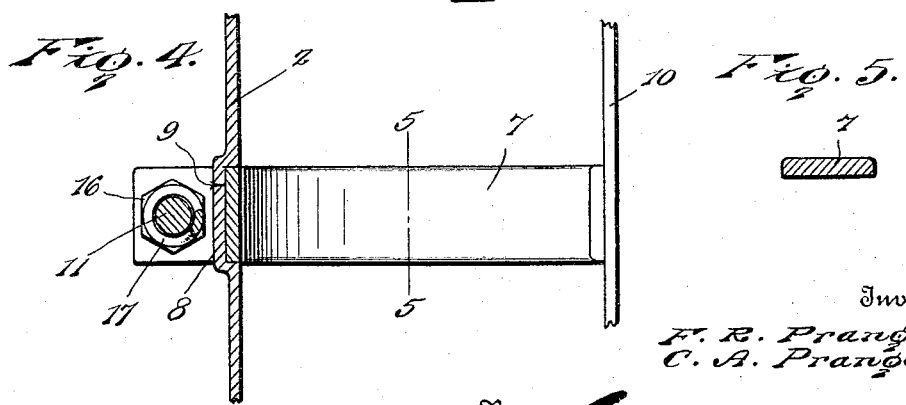

Patented Jan. 10, 1933

1,894,003

UNITED STATES PATENT OFFICE

FRANK R. PRANGE AND CHARLES A. PRANGE, OF MINNEAPOLIS, MINNESOTA

ANTISKID ATTACHMENT FOR WHEELS

Application filed July 13, 1931. Serial No. 550,522.

This invention relates to an anti-skid attachment adapted to be applied to the wheel of an automobile in operative relation to a tire carried thereby to prevent the wheels from spinning upon a slippery road or skidding.

One object of the invention is to provide a device of this character which may be very easily applied to a wheel which will serve very effectively to prevent slipping or skidding and at the same time will not interfere when an automobile is moved across a portion of a road free from ice or mud.

Another object of the invention is to so form the anti-skid device that it may be applied and left in place if so desired although it may be easily removed if slippery or muddy roads are not liable to be encountered during a trip.

Another object of the invention is to permit the anti-skid device to accommodate itself to the diameter of a tire to which it is applied thereby making it unnecessary to manufacture a device of the proper size for each size of tire ordinarily used.

Another object of the invention is to not only permit the ground engaging spikes or rods to accommodate themselves to the type of ground over which a vehicle is passing, but also permit these elements to be adjusted when necessary or removed and new ones substituted in case those already in use should become bent or broken.

The invention is illustrated in the accompanying drawings wherein:

Figure 1 is a view in side elevation looking at one side of a wheel equipped with the improved anti-skid device.

Figure 2 is a view in elevation looking at the opposite side of the wheel shown in Figure 1.

Figure 3 is a sectional view taken along the line 3—3 of Figure 1.

Figure 4 is a fragmentary sectional view taken along the line 4—4 of Figure 3, and Figure 5 is a sectional view taken along the line 5—5 of Figure 4.

The improved anti-skid device consists of a circular band adapted to be applied to a tire 1 at one side thereof as shown in Figures 1 and 3. This band is formed of sections 2 which are arcuate in shape and while two sections have been shown it will be understood that the number may be varied if so desired.

These sections have their ends spaced from each other and each section carries lugs 3 which project outwardly and are reinforced by webs 4 and formed with openings to receive bolts 5 serving to connect the adjoining ends of the sections. Springs 6 which fit about the bolts bear against the lugs thereby yieldably retaining the sections in spaced relation to each other and permitting them to have movement relative to each other. It will thus be seen that a band formed of the companion sections is provided which will accommodate itself to the size of the tire to which it is appled and also the sections may have movement relative to each other and permit necessary movements to take place when an automobile is in motion.

In order to retain the band in place against a side of a tire there has been provided traction yokes 7 each of which is U-shaped as shown in Figure 3 and preferably formed of a strip of strong metal bent to assume the desired shape. The inner arms of the yokes are engaged with the band sections 2 and by referring to Figures 3 and 4 it will be seen that each band has portions offset, thereby defining ribs 8 and internal recesses or seats 9 which extend radially of the band. The inner arms of the yokes are seated in the recesses 9 and preferably welded to the band 2 with their faces flush with the inner surfaces of the band sections. Therefore they will not project out of the seats and wear the side portions of a tire. The yokes fit snugly about the tire and at the opposite side of the tire from the band, the adjacent ends of the yokes are preferably welded to a strip 10 which is curved longitudinally as shown in Figure 3. It will be noted that the traction yokes are arranged in groups, each group being connected by longitudinally curved strips 2 and 10 so as to form inner and outer arcuate clamping members for engagement with a tire. As each arcuate clamping member is connected to one of the arcuate band sections, it follows that when the bolts 5 are released, the clamping members, together with the band sections, may be removed as a unit from the tire. Therefore the yokes will retain the band in proper engagement with the tire and also these yokes will serve to bite into muddy or snow covered ground and prevent a wheel from spinning. Corners of the yokes are rounded as shown in Figure 5 to prevent the yokes from cutting a tire.

Rods or pins 11 extend radially of the band and these rods which are formed of very strong metal and have their outer ends tapered to points as shown in Figures 1 and 3 extend longitudinally of the ribs 8 and are slidably mounted in lugs or bearing arms 12 and 13 formed at inner and outer ends of the ribs. The outer lugs are thicker than the inner lugs so that they will not be liable to be bent or broken if they should strike stones in a road. Each of the pins 11 is threaded for a portion of its length as shown at 14 and upon this threaded portion are mounted an abutment nut 15 and a lock nut 16 which serves to firmly secure the abutment nut in a set position. By adjusting these nuts, outward movement of the rods may be controlled and their sharpened outer end portions prevented from extending outwardly too far. When the outer ends of the rods or pins become worn, it is merely necessary to loosen the nuts and the pins may be moved outwardly until they again project the desired distance. The pins or rods are to be yieldably held in an extended position and in order to do so there has been provided springs 17 which fit about the rods and bear against the arms 12 and the nuts 16.

These springs are sufficiently strong to permit the outer ends of the pins to be embedded in snow or mud and prevent a wheel from spinning or skidding, but when an automobile is moving along a road having a hard surface, the pins will be forced inwardly against the action of their springs when the outer ends of the pins move into contact with the road. Therefore there will be no danger of the pins being bent or broken by contact with a road having a hard surface or by striking a stone. The fact that the pins may be moved inwardly during periods of dry weather when roads are not muddy or covered with snow also makes it unnecessary to remove the anti-skid device and they may be allowed to remain in place upon the wheels of an automobile where they will always be in position for use if muddy or slippery roads should be unexpectedly encountered during a trip.

When it is desired to remove the anti-skid device it is merely necessary to remove the nuts from the bolts 5 thereby releasing the sections 2 and the band sections may be easily lifted out of place and put away until again needed.

What is claimed is:

1. An anti-skid device comprising a band of a diameter to be disposed against a tire at one side thereof and consisting of arcuate sections, fasteners adjustably connecting the ends of said sections, traction yokes each having one end thereof secured to the adjacent section and its other end extended transversely across the tread of a tire and against the other side thereof strips connecting the last mentioned ends of certain of said yokes to form arcuate clamping members independent of and spaced circumferentially from each other, and yieldably supported traction devices carried by the band sections and adapted to project outwardly therefrom.

2. An anti-skid device comprising a band of a diameter to be disposed against a tire at one side thereof and consisting of arcuate sections, lugs extending from ends of said sections, bolts extending through said lugs to connect adjoining ends of the sections, springs about said bolts and bearing against said lugs to yieldably resist movement of the arcuate sections toward each other, traction yokes carried by said sections and extending transversely therefrom to engage across the tread of a tire, strips connecting the ends of certain of the yokes to form independent oppositely disposed arcuate clamping members spaced from each other circumferentially, and yieldably supported traction devices carried by the band sections and adapted to project outwardly therefrom.

3. An anti-skid device comprising a band of a diameter to be disposed against a tire at one side thereof and consisting of arcuate sections, fasteners adjustably connecting ends of said sections, portions of the sections being offset outwardly to form external ribs and internal seats extending radially of the sections, spaced traction yokes to engage across the tread of a tire and each having one end thereof terminating in an arm fitting within one of the seats and secured thereto, longitudinally curved strips connecting the other ends of certain of the yokes to form independent oppositely disposed arcuate clamping members spaced circumferentially from each other, and yieldably supported traction devices carried by said ribs and extending longitudinally thereof to project radially from the arcuate sections.

4. An anti-skid device comprising a band of a diameter to be disposed against a tire at one side thereof and consisting of arcuate sections, fasteners adjustably connecting ends of said sections, portions of the sections being offset outwardly to form external ribs and internal seats extending radially of the sections, spaced traction yokes to engage across the tread of a tire and each having an arm extending longitudinally in one of said seats and welded therein, longitudinally curved strips connecting the ends of certain of the yokes opposite the arm to form independent oppositely disposed arcuate clamping members spaced circumferentially from each other, bearing arms projecting from said ribs at inner and outer ends thereof, rods extending longitudinally of said ribs and slidably engaged through said arms, and springs yieldably retaining the rods in extended position with the outer ends projecting beyond the yokes and sharpened.

5. An anti-skid device comprising a band of a diameter to be disposed against a tire at one side thereof and consisting of arcuate sections, fasteners adjustably connecting the ends of said sections, portions of the sections being offset outwardly to form external ribs and internal seats extending radially of the sections, spaced traction yokes to engage across the tread of a tire and each having an arm fitting within one of said seats and rigidly secured therein, longitudinally curved strips connecting the ends of certain of the yokes opposite the arms to form independent oppositely disposed arcuate clamping members spaced circumferentially from each other, bearing arms projecting from said ribs at inner and outer ends thereof, rods extending longitudinally of said ribs and slidably engaged through said arms, nuts threaded upon said rods and constituting abutments to engage the outer bearing arms and limit outward movement of the rods, and springs about the rods engaging the inner bearing arms and nuts and serving to yieldably resist inward movement of the rods.

In testimony whereof we affix our signatures.

FRANK R. PRANGE. [L. S.]
CHARLES A. PRANGE. [L. S.]